(12) United States Patent
Widmer et al.

(10) Patent No.: US 6,548,589 B2
(45) Date of Patent: Apr. 15, 2003

(54) CEMENT DISPERSING POLYMERS FOR HIGH FLOW, HIGH STRENGTH AND SELFCOMPACTING CONCRETE

(75) Inventors: Jürg Widmer, Zürich (CH); Ueli Sulser, Oberengstringen (CH); Ulf Velten, Zürich (CH); Irene Schober, Zürich (CH); Theodor A. Bürge, Geroldswil (CH)

(73) Assignee: Sika Schweiz AG, Zurich (CH)

( * ) Notice: Subject to any disclaimer, the term of this patent is extended or adjusted under 35 U.S.C. 154(b) by 128 days.

(21) Appl. No.: 09/813,886

(22) Filed: Mar. 22, 2001

(65) Prior Publication Data

US 2001/0053804 A1 Dec. 20, 2001

(30) Foreign Application Priority Data

Mar. 22, 2000 (EP) .............................. 00105911

(51) Int. Cl.$^7$ .................................. C08J 3/02
(52) U.S. Cl. .................... 524/457; 526/317.1; 526/318; 526/319; 526/328.5; 526/310; 526/303.1; 526/307.2; 526/259; 526/260
(58) Field of Search .............................. 526/317.1, 318, 526/319, 328.5, 310, 303.1, 307.2, 259, 260; 524/457

(56) References Cited

U.S. PATENT DOCUMENTS 5,925,184 A * 7/1999 Hirata et al. ................ 106/696

FOREIGN PATENT DOCUMENTS

| EP | 792 850 A | 9/1997 |
| FR | 2 655 875 | 6/1991 |
| WO | WO 93 22358 A | 11/1993 |

OTHER PUBLICATIONS

European Search Report, EP 00 10 5911, Jul. 6, 2000.

* cited by examiner

Primary Examiner—David W. Wu
Assistant Examiner—William Cheung
(74) Attorney, Agent, or Firm—Burns, Doane, Swecker & Mathis, L.L.P.

(57) ABSTRACT

A multipurpose cement dispersing, shrinkage compensating and anticorrosive polymer and an admixture comprising said polymer, which improve the workability and the early strength development of fresh concrete, are described. Said polymer is an ester- and amid group-modified acrylic polymer, obtainable by aqueous solution radical copolymerization of (1) acrylic or methacrylic acid with (2) an acrylic or methacrylic methoxy-polyalkyleneglycolester monomer having 2 to 300 moles of an oxyalkylene group each having 2 to 3 carbon atoms, (3) optionally an acrylic or methacrylic methoxy-polyalkyleneglycolamide monomer having 2 to 300 moles of an oxyalkylene group each having 2 to 3 carbon atoms, (4) an acrylic or methacrylic ester of a tertiary aminoalkanol and (5) optionally an acrylic amide of a primary or secondary aliphatic, cycloaliphatic or aromatic amine.

22 Claims, No Drawings

CEMENT DISPERSING POLYMERS FOR HIGH FLOW, HIGH STRENGTH AND SELFCOMPACTING CONCRETE

CROSS REFERENCE TO RELATED APPLICATIONS

This application claims the priority of European Patent Application No. 00 105 911.2, filed Mar. 22, 2000, the disclosure of which is incorporated herein by reference in its entirety.

BACKGROUND OF THE INVENTION

The invention relates to water-soluble acrylic copolymers suitable as cement dispersing admixtures.

The quality of fresh concrete is determined by the ease and homogeneity with which it can be mixed, transported, compacted and finished. It can also be defined as the amount of internal work, necessary to achieve full compaction.

The Theological behavior of concrete is related to rheological terms such as plasticity and visco-elasticity of its cement paste.

Cement compositions, such as mortar or concrete, lose their flowability with the progression of time due to a fast stiffening effect caused by an early hydration reaction of cement and water. This loss of flow reduces its workability.

As the workability depends on the conditions of placement, the intended use will determine whether the concrete has the required workability.

Concrete from ready mix plants or mixed on job sites, used in civil engineering constructions, e.g. anchorage of big bridges, base plates or side walls and box culverts, in building structures such as heavy reinforced structures, concrete filling pipe structures or other complicated structures, demands to be fully compacted to achieve its required strength and durability. The existing and conventional method for compaction is by vibration of the freshly placed concrete.

A new production system for in situ-casted concrete is needed to improve significantly the cost situation as well as the health and safety aspects on the construction site.

Additionally, self compacting concrete leads to a higher productivity, shorter building times and to an improved labor environment.

Increased fluidity, defined e.g. as "flow-table spread", "slump" and "slump-flow", can be effected by using large dosages of water in the concrete, but it is well known that the resulting cement-based structure exhibits insufficient compactness due to excessive bleeding and segregation and consequently will have poor final compressive strength.

In order to avoid excess amount of water, flowing concrete can be produced by the addition of so called superplasticizers or high range water-reducing admixtures (HRWRs) like sulfonated melamine-formaldehyde polycondensates or naphthalene-formaldehyde polycondensates or ligninsulfonate based admixtures. All of these well known polymers are not capable of causing the treated cement compositions to retain high flowability over a sustained period of time (known as "slump life") without imparting a significant delay in the initial set time and considerable retardation of early strengths. An additional disadvantage is the inconstant and very low flow rate of freshly prepared concrete containing high quantities (e.g. 500 to 700 kg/m$^3$) of cement and up to 20% of silica fume and fly ash, which flow rate cannot be improved by the use of conventional HRWRs.

For heavy reinforced fresh precast concrete it is desired that the cementitious mixture has sufficient fluidity to flow through and around the reinforcement steel-structure to fill out the mold and level off at the top of the mold.

In the past ten years various polymer-admixtures based on so called polycarboxylic acid salts, e.g. copolymers of acrylic acid with acrylic esters of polyalkylene glycols have been proposed for imparting high water reduction, high flow and prolonged slump life to concrete, but most of them do not lead to self compacting concrete without causing a too long retardation of the setting time and the early-strength development.

Enhancing early, i.e. 1 day, compressive strengths, is of high importance in the precast and prestressed concrete industry, and chemical accelerators such as tertiary alkanolamines, alkali metal and alkaline earth metal thiocyanates, nitrites and halides are known in the art for this purpose and can be added separately to the fresh concrete.

Since calcium chloride and other inorganic salts can initiate corrosion of reinforcing steel embedded in hardened concrete, tertiary alkanolamines which show both, accelerating and corrosion inhibiting properties are the most recommendable chemical accelerators.

Unfortunately, tertiary amines are well known to act as powerful catalysts for the cleavage of esters and from this reason cannot be premixed with the acrylic ester polymers of the art and stored over longer periods thus causing strongly reduced shelf life of the blend.

In order to improve the stability of such admixtures, a deactivated form of alkanolamines was demanded which is reactivated in an alkaline environment.

The problem to be solved by the present invention is, that conventional cement dispersing polymers cannot be used as admixtures to produce simultaneously high flow- and high strength selfcompacting concrete.

Said problem could be solved with the introduction of a super high flow- or self compacting concrete, which is or contains a multipurpose polymer simultaneously acting 1) as a HRWR, 2) as set- and strength accelerator and 3) as corrosion inhibitor, these problems could be solved, particularly the need for vibration can be significantly reduced.

BRIEF SUMMARY OF THE INVENTION

Hence, it is a general object of the invention to provide—as a result of extensive studies—acrylic copolymers, which can solve this problem.

The invention is based on modified acrylic polymers having a) a poly (oxyalkylene) chain and b) a tertiary alkanolamine group which both are connected to the backbone of the polymer by ester bonds. Said polymers are obtainable by aqueous radicalic copolymerization of acrylic polyalkyleneglycol esters- and -amides with an acrylic acid and an acrylic ester of a tertiary alkanolamine.

In particular it was found that the relationship between the molar ratio of the free carboxylate groups to the polyoxyethylene ester groups and the polyoxyethylene amide groups in the polymer as well as the length of the polyoxyethylene chain strictly determines the performance of the copolymer as a dispersing, water reducing and slump-keeping agent.

The accelerating and anticorrosive effect of tertiary alkanolamines in aqueous solutions is known for long time. The inventive polymers react in alkaline cementitious compositions and the alkanolamine group is released from the polymer which is partly adsorbed to the cement surface. Due in particular to their close proximity to the cement surface, the released alkanolamines prove a high set accelerating and shrinkage reducing effect.

Moreover, results suppose, that the polymers also are adsorbed on the reinforcing steel bars in the fresh concrete where they can act as corrosion inhibitors directly on the surface of the steel.

DETAILED DESCRIPTION OF THE INVENTION

A water-soluble acrylic copolymer with cement dispersing, set-accelerating and anticorrosive properties to steel, as well as an admixture comprising an amount of from 5 to 95% of said water soluble acrylic copolymer, are described.

Said polymer is obtainable by copolymerization of an α,β-olefinic monocarboxylic acid or its salt shown by formula 1 given below, a second acrylic monomer shown by formula 2 given below, optionally a third acrylic monomer shown by formula 3 given below, a fourth acrylic monomer shown by formula 4 given below and optionally a fifth acrylic monomer given by formula 5, such that the molar ratio of constituent monomer units 1, 2, 3, 4, 5 is a:b:c:d:e=(0.1–0.9):(0.01–0.80):(0–0.80):(0.001–0.3):(0–0.5)

and a:(b+c+d+e)=0.1:0.9 to 0.9:0.1, whereby a designates the molar concentration range of constituent monomers 1, b designates the molar concentration range of constituent monomers 2, c designates the molar concentration range of constituent monomers 3, d designates the molar concentration range of constituent monomers 4, e designates the molar concentration range of constituent monomers 5 said monomers having the structural formulas shown below:

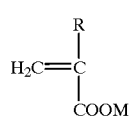
1

2

3

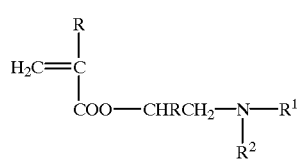
4

-continued

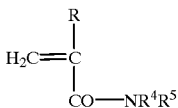
5 wherein each R independently from each other represents a hydrogen atom or a methyl group, $R^1$ and $R^2$ independently from each other represent a $C_1$-$C_4$-alkyl, a hydroxyethyl ($CH_2CH_2$ OH) group, an acetoxyethyl group ($CH_2$ $CH_2OCOCH_3$) group, hydroxy-isopropyl ($CH_2$—CHOH—$CH_3$) group, an acetoxy-isopropyl (CH2—CHOCOCH3) group, or $R^1$ and $R^2$ may together with the nitrogen atom to which they are bound, form a morpholine ring;

$R^3$ is a $C_1$-$C_4$-alkyl, $R^4$ and $R^5$ independently represent an aliphatic, cycloaliphatic, araliphatic or aromatic or $R^4$ and $R^5$ may together with the nitrogen atom to which they are bond form a morpholine- or imidazole ring system, M represents hydrogen, an alkali metal, an alkaline earth metal, an aluminum ion, an ammonium- or organic ammonium group, such as an ammonium group derived from alkylamines or alkanolamines, in particular amines comprising $C_1$ to $C_4$ alkyl and/or $C_1$ to $C_4$ alkanol groups, x and y independently represent integers from 2–300.

In the solvent polymerization using an aqueous solvent, a water soluble polymerization initiator such as ammonium salts, alkali metal salts of a peroxy acid or hydrogen peroxide is used as the polymerization initiator.

Further, to control the molecular weight, a chain transfer agent such as alkali sulfite, hydrogensulfite, mercaptoethanol, thioglycolic acid or thioglycerol (3-mercapto-1,2-propanediol) may be used.

It is preferable that the inventive polymer has a number-average molecular weight of 1000 to 100000, still more preferably 1000 to 30000.

When the molecular weight is too large, the resulting copolymer will exhibit a poor dispersing effect, while, when it is too small, the resulting copolymer will exhibit not only poor dispersity but also a poor slump retaining effect. Moreover, a defined molar proportion of 1–5 to 1 of carboxylic-groups to methoxypolyalkyleneglykol ester side chains and methoxypolyalkyleneglycol amide side chains at the backbone of the copolymer is preferred.

The average molecular weight is determined by gel permeation chromatography using a set of defined polyalkyleneglycols as standard reference.

Following a further aspect of the present invention the inventive copolymers are employed for preparing a cement-dispersing, set accelerating admixture having shrinkage-reducing and anticorrosive properties to steel. Hence, further to the invention, said admixture preferably contains at least one defoaming and/or at least one air-controlling agent.

Still a further aspect of the present invention is a mortar, concrete, cement or cementitious binder containing the modified acrylic polymer according to the present invention in an amount of 0.01 to 10% by weight of the binder, said mortar or concrete having a unit content of binder composed of cement or a mixture of cement and latent hydraulic or inert microscopic powder of 150 to 800 kg/m³, preferably of 250 to 650 kg/m³.

In a preferred embodiment, the cement is Portland cement, white cement, high alumina cement, and cement blends wherein the latent hydraulic or inert microscopic powder is fly ash, slag, natural pozzolane, silica fume, burnt oil shale, metakaolin or calcium carbonate.

The inventive admixture can be used in liquid form, e.g. by addition of water, in powder form and can be added before, during or after the grinding operation of the cement or the cementitious binder.

EXAMPLES

In the following, some copolymers of the present invention and cement dispersing admixtures comprising such polymers, the method for producing the same and the cement containing composition of the present invention are explained in more detail with the following examples E1–E6 and comparative examples C1, C2, and C3. Moreover, for comparison, commercially available polymers C7, C8 and C9 are also used for the preparation and testing of flowing concrete (test example 1) and high-strength, self compacting concrete of low water-to-cement ratio (test examples 2 and 3).

In test examples 4–6 the corrosion inhibiting effect of the inventive polymers on mild steel and on reinforcing steel is demonstrated and compared to comparative examples.

However, it must be noted that all these examples are given for illustrative purposes only and are not supposed to limit the invention, as defined by the claims, appended hereto.

The following polyalkyleneglycol-based acrylic esters and -amides have been used in the examples described below (table 1):

dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1) 493 g (0.24 mol) of monomer 3-3, 82 g (0.04 mol) of monomer 3-4 and 6 g of 50%-sodium hydroxide in 180 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=9300 g/mol was obtained.

Example E1

Polymer E1

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1), 493 g (0.24 mol) of monomer 3-3, 82 g (0.04 mol) of monomer 3-4, 15 g (0.05

TABLE 1

| Structure | Description |
|---|---|
| $H_2C=C(R)-COO(CH_2CHO)_y(CH_2CH_2O)_xCH_3$ with R on the CHO | Acrylic ester monomers:<br>Monomer 2-1: Methoxypolyoxyalkylene acrylate x = 22, y = 0<br>Monomer 2-2: Methoxypolyoxyalkylene (meth)acrylate x = 22, y = 0<br>Monomer 2-3: Methoxypolyoxyethylene (meth)acrylate x = 44, y = 0<br>Monomer 2-4: Methoxypolyoxyalkylene(methacrylate x = 16, y = 5 |
| $H_2C=C(R)-CO-NH(CH_2CHO)_y(CH_2CH_2O)_xCH_3$ with R on the CHO | Acrylamide-Monomers:<br>Monomer 3-1: Methoxypolyoxyalkylene acrylamide x = 11; y = 0<br>Monomer 3-2: Methoxypolyoxyalkylene acrylamide x = 19; y = 3<br>Monomer 3-3: Methoxypolyoxyalkylene acrylamide x = 32; y = 10<br>Monomer 3-4: Methoxypolyoxyalkylene acrylamide x = 6; y = 29<br>Monomer 3-5: Methoxypolyoxyalkylene acrylamide x = 16, y = 5 |

Comparative Example C1

Polymer C1

Into a 2 liter-glass reactor, equipped with a stirrer, reflux condenser, $N_2$-inlet tube and automatic dosing mechanism, were placed 0.30 g of ferrous sulfate and 5 g of thioglycerol mol) dimethylaminoethyl acrylate and 6 g of 50%-sodium hydroxide in 180 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=9900 g/mol was obtained.

Comparative Example C2

Polymer C2

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1), 513.5 g (0.25 mol) of monomer 2-2, 50 g of polypropyleneglycol of MW 4000 and 6 g of 50%-sodium hydroxide in 180 g Water, b) a solution of 15 g of 35%-hydrogen peroxide and c) 4 g ascorbic acid in 25 g water.

After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=10100 g/mol was obtained.

Example E2

Polymer E2

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1), 513.5 g of monomer 2-2, 59 g of polypropyleneglycol of MW 4000, 2.15 g (0.015 mol) of dimethylaminoethyl acrylate and 6 g of 50%-sodium hydroxide in 200 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight $M_n$=9900 g/mol was obtained.

Comparative Example C3

Polymer C3

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1), 685 g (0.65 mol) of monomer 2-1, 47 g (0.085 mol) of monomer 3-1, and 6g of 50%-sodium hydroxide in 250 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=11100 g/mol was obtained.

Example E3

Polymer E3

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1), 685 g (0.65 mol) of monomer 2-1, 47 g (0.085 mol) of dimethylaminoethyl acrylate and 6 g of 50%-sodium hydroxide in 250 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=10700 g/mol was obtained.

Comparative Example C4

Polymer C4

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1) 516 g (0.49 mol) of monomer 2-1, 95 g (0.09 mol) of monomer 3-2 and 6g of 50%-sodium hydroxide in 200 g Water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=10200 g/mol was obtained.

Example E4

Polymer E4

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1), 516 g (0.49 mol) of monomer 2-1, 95 g (0.09 mol) of monomer 3-2 and 2.86 g (0.02mol) of dimethylaminoethyl acrylate in 200 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight $M_n$=9700 g/mol was obtained.

Comparative Example C5

Polymer C5

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes a) an aqueous solution of 72 g (1 mol) of freshly distilled acrylic acid (monomer 1) 580 g (0.55 mol) of monomer 2-1, 28 g (0.12 mol) of N,N-dicyclohexyl acrylamide and 6 g of 50%-sodium hydroxide in 220 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=10300 g/mol was obtained.

Example E5

Polymer E5

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C. Then simultaneously were added in 60 minutes, a) an aqueous solution of 72 g (1 mol) of freshly distilled acrylic acid (monomer 1), 580 g (0.55 mol) of monomer 2-1, 2.86 g (0.02 mol) of dimethylaminoethyl acrylate and 6g of 50%-sodium hydroxide in 220 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight of $M_n$=9500 g/mol was obtained.

Example E6

Polymer E6

Into a 2 liter-glass reactor, equipped with a stirrer, reflux condenser, $N_2$-inlet tube and automatic dosing mechanism, were placed 0.30 g of ferrous sulfate and 5 g of thioglycerol dissolved in 380 g water. The inside atmosphere of the flask was replaced with stirring by nitrogen gas and the solution heated to 60° C.

Then simultaneously were added in 60 minutes a) an aqueous solution of 72 g (1 mol) of freshly distilled acrylic acid (monomer 1), 317 g (0.19 mol) of monomer 2-4, 317 g (0.19 mol) of monomer 3-5 and 2.15 g of of dimethylaminoethyl acrylate in 200 g water, b) a solution of 15 g of 35%-hydrogen peroxide and c) 4 g ascorbic acid in 25 g water. After the completion of the addition, in course of which the temperature raised to 75° C., the reaction system was maintained at that temperature for 15 minutes. Finally, the mixture was cooled to 25° C. and 2 g of methoxy-polyoxyalkyleneamine of MW=2000 with a PO/EO mol. ratio of 29:6 were added. 35 g of 50%-sodium hydroxide were then added dropwise to adjust the pH-value to 5.0. Water was added to give a 40%-solution. A polymer of a number average molecular weight $M_n$32 9900 g/mol was obtained.

Comparative Example C6

Polyacrylic Acid

SOKALAN PA 25 CL PN (BASF, Badische Anilin& Sodafabrik) a 50% aq. solution of a partially neutralized polyacrylic acid of weight-average molecular weight 4000 was used as a comparative dispersant for concrete.

Comparative Example C7

Melamine Polymer

Melment F-10 (Süddeutsche Kalkstickstoffwerke, Trostberg, BRD), a commercial dispersing agent for hydraulic cement compositions, is the sodium salt of a sulfonated melamine formaldehyde polycondensate of molecular weight of about 15,000.

Comparative Example C8

MIGHTY-150(KAO Corp., Tokyo), a commercial dispersing agent for hydraulic cement masses, is the sodium salt of a sulfonated naphthalene-formaldehyde polycondensate of average molecular weight of about 5,000–6,000.

TEST-EXAMPLES

These examples were performed to demonstrate the improved fluidizing effects of the inventive polymers on fresh concrete and their accelerating action on the development of the early (1d) compressive strengths. The inventive polymers E1 to E5, were tested as fluidizers in flowing concrete (test-example 1) and as admixtures to improve the flowability and slump life of high-strength concrete of low water-to-cement ratio and high binder (cement+silica-fume) content (test example 2).

Those comparative polymers (C1 to C8) described above were also tested and compared in this context.

Test-Example 1

Flowing Concrete

Use of inventive polymers and comparative polymers for flowing concrete.

The consistency of freshly prepared concrete i.e. the mobility or viscosity, is the most important characteristic of workability. For measuring the consistency of concrete a "flow table spread" according to DIN 1048, part1 is used in industry.

Sometimes the "slump test" according to ASTM C143 is additionally used.

For purposes of this experiment the flow table spread was determined by placing concrete in an iron form on a two-part table (70×70 cm). By removing the form, a concrete body having a truncated cone shape is prepared. Then, the are of the table is lifted on one side for 4 cm, and allowed to fall. This procedure is carried out 15 times, and the concrete spreads. The average diameter of the formed cake corresponds to the flow table spread.

For the slump test, three layers of concrete are put into a mold having a shape of a truncated cone and having certain dimensions, and compressed with 25 pushes of an iron bar. At the top, the concrete is stripped off evenly, then, the form is vertically removed. The concrete body will sink in by itself. The slump is measured by determining the vertical difference between the top of the mold and the displaced original center of the top surface of the test sample.

In order to compare the obtained test results and to bring them into a relation with the consistency, the freshly prepared concrete (see DIN 18555, Part2) may be divided into consistency ranges:

TABLE 2

Consistency Ranges of Freshly Prepared Concrete

| Denotation | Flow Table Spread (cm) | Slump (cm) |
|---|---|---|
| K1 = rigid | <30 | <1 |
| K2 = semi-plastic | 30 to 40 | 1 to 9 |
| K3 = plastic | 41 to 50 | 10 to 15 |
| K4 = flowing concr. | >50 | >15 |

Fluidizers are used when specific construction applications are necessary. Flowing concrete is used when high inserting rates (e.g., from 50 to 150 m³/hour) are required, or when the form and reinforcement of a construction part do not allow a compacting of the concrete by vibration.

Concretes having K2 or K3 consistencies may be prepared from a concrete of K1 consistency by adding fluidizers (also designated as superplasticizers) when increased mechanical strength at an equal remaining workability shall be obtained.

For a freshly prepared concrete, the fluidizing effect is dependent on the dosage of the superplasticizer. Usually, from 0.2 to 1.5% solid matter quantities (in dissolved form), referred to the weight of cement, are added.

To a high degree, the effect is also dependent on the chemical structure and the molecular weight of the polymer, which forms the basis of the fluidizer.

In order to demonstrate the increased effectiveness of the inventive copolymers, the flow behavior of concrete mixtures containing the copolymers E1 to E5 was measured according to DIN 1048, part1, and ASTM C143. As a comparison, the polymers C-1 to C-8 were also tested with the same methods.

TABLE 3

Composition of the fresh concrete mixtures

| Components | Quantity in kg |
|---|---|
| Normal Portland Cement.Type1 | 7.5 |
| Netstal filler (chalk filler) | 1.5 |
| Rhine sand "Epple" up to 1.2 mm.* | 9.5 |
| Rhine sand "Epple" 1.2 to 4.0 mm.* | 8.0 |
| Rhine sand "Epple" 4.0 to 8.0 mm.* | 4.5 |
| Mine gravel 8 to 16 mm.* | 9.5 |
| Mine gravel 16 to 32 mm.* | 17.0 |
| Total Water, including mixing water and water of the copolymer solution | 3.45, 0.04, dissolved |
| Copolymer(solid) or comparative polymer, used as fluidizer | in the mixing water |

*washed and dried

Preparation and Handling of the Concrete Specimen

The cement and the aggregates were premixed for 15 seconds in a 50 liter forced circulation mixer for concrete. The mixing water, containing the fluidizer, was added slowly under stirring over 20 seconds. The batch was then mixed in a wet state for an additional 60 seconds. A part of the fresh concrete was then immediately filled into the mold for the determination of the flow table spread and the slump.

Immediately after measuring the flow table spread, test bodies having edges of 12×12 cm were prepared, and the compressive strength was measured after 1, 7, and 28 days in accordance with DIN 1048, Part 1. The determination of initial setting was carried out according to ASTM-C 403.

Additionally, the copolymers of the present invention were compared to the comparative polymers C-1 to C-3.

As mentioned above, the flow table spread and slump was measured immediately after mixing, and re-measured at 60 and 120 minutes after mixing. A mixing up of the concrete for five seconds was carried out before each new measurement.

Concrete test mixtures No 1 to 11 which were prepared under the same conditions, were then subjected to the above-described examination of flow table spread and slump depending on the time.

The results are summarized in Table 4. They show a high water reduction and a surprisingly long lasting constancy of the flow table spread and the slump of up to 120 minutes in test mixtures nos. 2, 4, 6, 8, 10, 11 containing the copolymers according to the invention. From a comparison of these mixtures with comparative mixtures nos.1, 3, 5, 7 and 9 containing the alkanolamine-free polymers, it can be seen, that the comparative test mixtures show a strong retardation of the early strength development. Also, comparative mixtures no 12, 13 and 14 containing polyacrylic acid and melamine- and naphthalene polycondensate show a considerable stiffening tendency already 60 minutes after mixing.

TABLE 4

Time-dependent flow behavior and compressive strengths of flowing concrete of water-to-cement ratio W/C = 0.46 using inventive and comparative polymers as fluidizers.

| Test-Mixture No | Polymer example | Dosage in % of cement weight | Flow table spread/slump in cm, x minutes after mixing | | | Compressive strength in Newton/mm² y days after mixing | | | %-Air content after mix |
|---|---|---|---|---|---|---|---|---|---|
| | | | x = 0 | 60 | 120 | y = 1 | 7 | 28 | |
| 1 | C1 | 0.3 | 61/24 | 60/24 | 50/19 | 14.0 | 42.8 | 47.9 | 1.9 |
| 2 | E1 | 0.3 | 59/22 | 57/21 | 51/17 | 20.4 | 43.3 | 48.5 | 2.0 |
| 3 | C2 | 0.3 | 52/19 | 53/20 | 50/18 | 17.5 | 39.7 | 48.0 | 2.0 |
| 4 | E2 | 0.3 | 50/18 | 52/19 | 49/19 | 23.2 | 44.3 | 46.0 | 1.8 |
| 5 | C3 | 0.3 | 56/21 | 54/22 | 50/20 | 14.9 | 39.0 | 47.1 | 1.9 |
| 6 | E3 | 0.3 | 55/20 | 54/21 | 52/19 | 20.4 | 42.3 | 50.2 | 1.6 |
| 7 | C4 | 0.3 | 54/20 | 52/20 | 50/20 | 15.6 | 41.2 | 50.0 | 2.7 |
| 8 | E4 | 0.3 | 60/22 | 60/24 | 53/20 | 22.3 | 44.5 | 50.2 | 1.8 |
| 9 | C5 | 0.3 | 56/22 | 55/19 | 48/18 | 17.0 | 45.0 | 50.3 | 2.5 |
| 10 | E5 | 0.3 | 61/20 | 60/25 | 52/20 | 20.5 | 42.0 | 49.8 | 1.8 |
| 11 | E6 | 0.3 | 60/21 | 61/23 | 61/22 | 21.9 | 43.0 | 51.2 | 2.0 |
| 12 | C6 | 0.3 | 30/0 | — | — | — | 22.4 | 45 | 2.8 |
| 13 | C7 | 0.3 | 42/12 | — | — | 26.9 | 48.1 | 60.9 | 1.5 |
| 14 | C8 | 0.3 | 45/14 | 33/1 | — | 21.0 | 43.5 | 50.0 | 1.9 |

The measurement of flowing properties of fresh mixtures of high flowing -high strength concrete of very low water-to-cement ratio (W/C) is described in the next test-example.

Test-Example 2

High Flowing-High Strength Concrete.

High flowing-high strength concrete of very low water-to-cement ratio and very high content of binder (cement+silicafume) is increasingly demanded by the building- and construction industry. Preparation and testing are prescribed in Japanese Industrial Standards (JIS-A).

Preparation of the Concrete Mixtures

In a mixing ratio as shown in table 5, ordinary Portland cement, silica fume, fine aggregates and coarse aggregates (gravel) were sequentially placed inside a forced mixing-type mixer of 50 liters volume. The cement and the aggregates were premixed for 15 seconds, and then the mixing water, containing the fluidizer and 0.02% (related to the weight of fluidizer) of a synthetic air detrainer, was added slowly under stirring over 20 seconds. The batch was then mixed in a wet state for 3 minutes. After mixing, the mixture was transferred to a mixing boat and retempering was conducted at a predetermined number of times every 60 minutes and the slump flow and slump with the progression of time was measured for up to 120 minutes according to JIS-A 1101. The procedures specified in JIS-A 1123 and JIS-A 6204 were employed to measure air content and time-dependent compressive strengths.

TABLE 5

Concrete Mix Proportion for Self Compacting Concrete

| W/B | S/A | Polymer-Dosage | UNIT CONTENT (kg/m³) | | | | |
|---|---|---|---|---|---|---|---|
| | | | W | C | SF | S | G |
| 22% | 39% | 1.6% | 165 | 675 | 75 | 600 | 950 |

Raw materials:
W = Mixing water, including water of the added fluidizer.
C = Cement: Normal Portland Type 1
SF = Undensified Silicafume:, density: 2.2–2.7, surface: 100.000–250.000 cm²/g
S = Sand Epple: 0–1.2 mm, 300 kg   1.2–4 mm, 300 kg
G = Gravel Epple: 4–8 mm, 280 kg   8–16 mm 670 kg
A = Aggregate: Sand + Gravel
B = Cement + Silicafume
Polymer-dosage: dosage (weight %) of solid polymer, contained in the fluidizer, in relation to the cement weight.

Results of the evaluation of the mixtures, containing inventive and comparative polymers, are shown in table 6.

TABLE 6

Time-dependent flow behavior and compressive strengths of Flowing concrete of water-to-cement ratio W/C = 0.22, using inventive and comparative polymers as fluidizers.

| Test-Mixture No | Polymer designation | Polymer dosage in % | Slump-flow in cm x minutes after mixing | | | Compressive strength in Newton/mm² y days after mixing | | % Air content after mixing |
|---|---|---|---|---|---|---|---|---|
| | | | x = 0 | 60 | 120 | y = 1 | 28 | |
| 1 | C1 | 1.6 | 51 | 58 | 60 | 11.7 | 97.9 | 2.1 |
| 2 | E1 | 1.6 | 50 | 52 | 60 | 22.0 | 101.0 | 2.0 |
| 3 | C2 | 1.6 | 51 | 55 | 59 | 13.7 | 102.0 | 2.4 |
| 4 | E2 | 1.6 | 56 | 61 | 59 | 29.1 | 100.0 | 2.0 |
| 5 | C3 | 1.6 | 54 | 53 | 51 | 8.8 | 103.4 | 1.9 |
| 6 | E3 | 1.6 | 61 | 60 | 59 | 22.6 | 105.0 | 1.8 |
| 7 | C4 | 1.6 | 60 | 61 | 60 | 14.6 | 100.0 | 2.1 |
| 8 | E4 | 1.6 | 60 | 64 | 62 | 24.7 | 102.5 | 2.2 |
| 9 | C5 | 1.6 | 54 | 58 | 60 | 16.0 | 101.1 | 2.4 |
| 10 | E5 | 1.6 | 57 | 61 | 59 | 23.9 | 104.3 | 2.3 |
| 11 | E6 | 1.6 | 60 | 62 | 62 | 24.0 | 105.0 | 2.4 |
| 12 | C6 | — | <35 | — | — | — | 63.9 | 8.4 |
| 13 | C7 | 1.6 | 43 | — | — | 31.1 | 102.4 | 1.8 |
| 14 | C8 | 1.6 | 48 | | | 19.3 | 93.2 | 3.8 |

It is evident from table 6, that the test mixtures 2, 4, 6, 8 10 and 11, containing the inventive, dimethylaminoethyl acrylate-modified polymers, show an improved setting behavior and early-strength development as compared to comparative mixtures 1, 3, 5, 7 and 9 which exhibit strong retardation of initial setting and early strengths whereas test mixtures 12, 13 and 14, which contain conventional polymers, show only poor flowability.

Test-Example 3

Corrosion Inhibition of Mild Steel

The anticorrosive activity of the polymers was tested by the stacked steel test, as is known.

An aqueous solution containing 1.6% by weight of the polymers and having a water hardness of 177 ppm of calcium was prepared for use in the test.

Mild steel cylinders of 3.3–4.5 cm length and 2.5 cm in diameter were used as the test material. All surfaces except one end were coated with an epoxy coating.

The exposed test end of each slug was polished with a power grinding wheel, then was covered with about 1 g of the 1.6%-polymer solution. The exposed end of the second steel slug was placed over the test end to spread the film and prevent evaporation. The stacked steel slugs were then placed in an equilibrated desiccator over water. Tests were carried out at 20° C.

Tap water of 177 ppm hardness was used as a control in each test.

The test results (table 7) showed, that solutions containing the inventive polymers even at low concentrations were non corrosive whereas none of the comparative polymers did develop an anticorrosive activity.

TABLE 7

Time-dependent corrosion of mild steel in water: Inhibition by inventive polymers

| Test No. | Polymer designation | Concentration of the aq. polymer solution | Period of examination [days] | Condition of steel after test |
|---|---|---|---|---|
| 1 | Control | — | 1d | K |
| 2 | Control | — | 7d | K-st |
| 3 | C1 | 1.6% | 1d | Inh |
| 4 | C1 | 1.6% | 7d | K |
| 5 | E1 | 1.6% | 1d | Inh |
| 6 | E1 | 1.6% | 7d | Inh |
| 7 | C2 | 1.6% | 7d | K |
| 8 | E2 | 1.6% | 7d | Inh |
| 9 | E3 | 1.6% | 7d | Inh |
| 10 | C3 | 1.6% | 1d | K |
| 11 | C4 | 1.6% | 1d | K |
| 12 | E4 | 1.6% | 7d | Inh |
| 13 | E4 | 1.6% | 28d | Inh |
| 14 | E5 | 1.6% | 7d | Inh |
| 15 | E6 | 1.6 | 7d | Inh |
| 16 | C5 | 1.6% | 1d | K |

K: Distinct traces of corrosion visible on the steel
K-st: Strong corrosion visible
Inh: No corrosion visible Test-Example 4

Measurement of the Anticorrosive Effect of Inventive Polymers on Mild Steel in CaCl-Solutions by Cyclic Voltammetry (CV)

In this example, the influence of the inventive, anolamine-modified corrosion inhibiting polymers in comparison to non modified polymers C1, C2 and C3 on mild steel specimens was investigated.

The examination was carried out by means of potentiodynamic polarization measurements, performed in aqueous, chloride containing solutions using a potentiostat/galvanostat with scan option and a Camec II station.

Test Conditions:

$U_{max} \pm 5V$, $v_u = 1-8350$ mV/min working electrodes: polished steel plates (mild steel ST37)

v=10 mV/s concentration of inventive and comparative polymers: 1.60% based on solids.

The test solution was neither stirred, nor degassed. The electrode was conditioned for one hour at; i=0.0 mA/cm², then polarization was started.

Test period: 1 hour; $i_{max}$=0.5 mA/m'$j_0$ and $j_u$ depending on currents ($i_{max}$=30–50 mA)

After a further conditioning at i=0.50 mA/cm² for 30 minutes, the CV was performed in cathodic direction during 30 minutes.

As can be seen from the data in table 8, all inventive polymers perform substantially better than the comparative polymers as well as the control, showing higher positive values of both, the pitting- and the repassivation potentials.

TABLE 8

Cyclic voltammetry at mild steel electrode in saturated $Ca(OH)_2$ + 0.09 M—NaOH

| Test No. | Polymer designation | Concentration of polymer in test solution [%] | Pitting potential vs SCE Ø 3 scans [mV] | Repassivation potential vs SCE Ø 3 scans [mV] |
|---|---|---|---|---|
| 1 | Control | — | +275 | −520 |
| 2 | C1 | 1.6 | +235 | −575 |
| 3 | E1 | 1.6 | +1200 | +990 |
| 4 | C2 | 1.6 | +375 | −600 |
| 5 | E2 | 1.6 | +990 | +720 |
| 6 | C3 | 1.6 | +405 | −590 |
| 7 | E3 | 1.6 | +1180 | +980 |
| 8 | C4 | 1.6 | +630 | −410 |
| 9 | E4 | 1.6 | +1000 | +720 |

Test-Example 5

In the following, the influence of inventive tert.-alkanolamines containing polymers on the shrinkage behavior of a mortar of high cement content is demonstrated by the measurement of the strain of 4×4×16 cm³ prisms fitted with an inserted neck.

| Composition of the fresh mortar: | |
|---|---|
| Portland cement type CEM I 42.5 | 0.750 kg |
| Sand 0–8 mm | 3.150 kg |
| Water | 0.350 kg |
| Inventive or comparative polymer | 0.012 kg |

The test specimen were initially stored for 24 at 20° C. and 95% RH, subsequently, at 23° C. and 50% RH.

TABLE 9

Effect of inventive, shrinkage compensating polymers on the strain of mortar prisms.

| Test No. | Polymer Designation | Dosage of solid Polymer, calculated on cement weight (%) | Strain after 28 d |
|---|---|---|---|
| 1 | Control | 1.6 | −0.057 |
| 2 | C1 | 1.6 | −0.045 |
| 3 | E1 | 1.6 | −0.019 |
| 4 | C2 | 1.6 | −0.045 |
| 5 | E2 | 1.6 | −0.024 |
| 6 | C3 | 1.6 | −0.049 |
| 7 | E3 | 1.6 | −0.036 |
| 8 | C4 | 1.6 | −0.047 |
| 9 | E4 | 1.6 | −0.022 |
| 10 | C5 | 1.6 | −0.044 |
| 11 | E5 | 1.6 | −0.022 |

This example clearly demonstrates the shrinkage compensating effect of up to 50% of the inventive polymers on mortar pieces whereas comparative polymers show only poor reduction as compared to the control specimen.

While there are shown and described presently preferred embodiments of the invention, it is to be distinctly understood that the invention is not limited thereto but may be otherwise variously embodied and practiced within the scope of the following claims.

What is claimed is:

1. A water-soluble acrylic copolymer with cement dispersing, set-accelerating and anticorrosive properties to steel, obtained by copolymerization of an α,β-olefinic monocarboxylic acid or its salt shown by formula 1 given below, a second acrylic monomer shown by formula 2 given below, optionally a third-acrylic monomer shown by formula 3 given below, a fourth acrylic monomer shown by formula 4 given below, and optionally a fifth acrylic monomer given by formula 5, such that the molar ratio of constituent monomer units 1, 2, 3, 4, and 5 is a:b:c:d:e=1:(0.01–0.80):(0–0.80):(0.001–0.3):(0–0.5), and a:(b+c+d+e)=0.1:0.9 to 0.9:0.1, wherein a designates the molar concentration range of constituent monomers 1, b designates the molar concentration range of constituent monomers 2, c designates the molar concentration range of constituent monomers 3, d designates the molar concentration range of constituent monomers 4, e designates the molar concentration range of constituent monomers 5, said monomers having the structural formulas shown below:

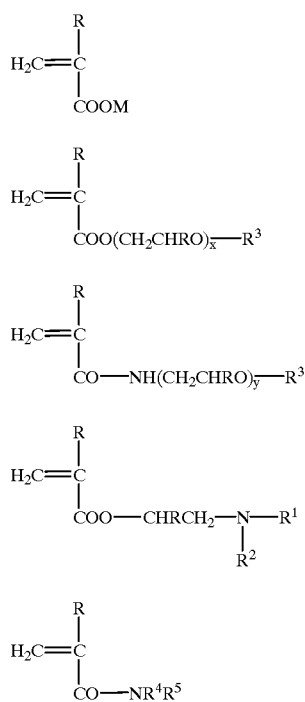

wherein each R independently from each other represents a hydrogen atom or a methyl group, $R^1$ and $R^2$ independently from each other represent a $C_1$–$C_4$-alkyl, a hydroxyethyl ($CH_2CH_2OH$) group, an acetoxyethyl group ($CH_2CH_2OCOCH_3$) group, a hydroxy-isopropyl ($CH_2$—$CHOH$—$CH_3$) group, an acetoxy-isopropyl ($CH_2$—$CHOCOCH_3$) group, or $R^1$ and $R^2$ may together with the nitrogen atom to which they are bonded, form a morpholine ring;

$R^3$ is a $C_1$–$C_4$-alkyl, $R^4$ and $R^5$ independently represent an aliphatic, cyoloaliphatic, araliphatic or aromatic or $R^4$ and $R^5$ may together with the nitrogen atom to which they are bonded form a morpholine or imidazole ring system, M represents hydrogen, an alkali metal ion, an alkaline earth metal ion, an aluminum ion, an ammonium- or organic ammonium group; and x and y independently represent integers from 2–300.

2. The modified acrylic polymer of claim 1, wherein the monomer 1 is acrylic acid or methacrylic acid.

3. The modified acrylic polymer of claim 1, wherein the monomer 2 is a methoxy-polyoxyethylene acrylate of a molecular weight of 350 to 5000 g/mol.

4. The modified acrylic polymer of claim 1, wherein the monomer 3 is a methoxy-polyoxyalkylene acrylamide of a molecular weight of 500 to 5000 g/mol.

5. The modified acrylic polymer of claim 1, wherein the monomer 4 is the acrylic ester of a tertiary alkanol amine.

6. The modified acrylic polymer of claim 5, wherein the monomer 4 is dimethylaminoethyl acrylate.

7. The modified acrylic polymer of claim 1, wherein the monomer 5 is the acrylamide of oxazolidine.

8. The modified acrylic polymer of claims 1, wherein the monomer 5 is the acrylamide of dicyclohexylamine.

9. The modified acrylic polymer of claim 1, having a number average molecular weight in the range of 5,000 to 50,000.

10. A method for preparing a modified acrylic polymer of claim 1, wherein the monomers 1, 2, 3, 4, and 5 are reacted by aqueous solution radical copolymerization in the presence of aqueous hydrogen peroxide as initiator.

11. The method of claim 10, wherein an organic thiol compound is used as a chain-transfer agent.

12. The method of claim 11, wherein thioglycerine is used as a chain-transfer agent.

13. A modified acrylic polymer obtained by the method of claim 10.

14. A cement dispersing, set accelerating admixture having anticorrosive properties to steel and preferably also shrinkage reducing properties, that contains a modified acrylic polymer of claim 1 in amounts of from 5 to 95%, and that is in liquid or powder form.

15. The cement admixture of claim 14, containing at least one defoaming or antifoaming agent.

16. The cement admixture of claim 14, containing at least one air controlling agent.

17. A mortar, concrete, cement or cementitious binder containing the modified acrylic polymer of claim 1 in an amount of 0.01 to 10% by weight of the binder, said mortar or concrete having a unit content of binder composed of cement or a mixture of cement and latent hydraulic or inert microscopic powder of 150 to 800 kg/m³.

18. The mortar, concrete, cement or cementituous binder of claim 17, wherein the cement is Portland cement, white cement, high alumina cement, and wherein the latent hydraulic or inert microscopic powder is fly ash, slag, silica fume, burnt oil shale, metakaolin or calcium carbonate.

19. A method for producing a mortar, concrete, cement or cementitious binder of claim 17, wherein the modified acrylic polymer is added comprised in an admixture of claim 14 before, during, or after the grinding operation of the cement or the cementitious binder.

20. An aqueous slurry of microscopic powders containing the modified acrylic polymers of claim 1 in an amount of 0.01 to 10% by weight of the binder.

21. The aqueous slurry of microscopic powders of claim 20, wherein the microscopic powder is calcium carbonate, gypsum or gypsum based solids.

22. The mortar, concrete, cement or cenientitious binder of claim 17, said mortar or concrete having a unit content of binder composed of cement or a mixture of cement and latent hydraulic or inert microscopic powder of 250 to 650 kg/m$^3$.

* * * * *